(12) United States Patent
Lei

(10) Patent No.: US 12,317,207 B2
(45) Date of Patent: May 27, 2025

(54) METHOD FOR UPLINK SYNCHRONIZATION, COMMUNICATION APPARATUS, AND STORAGE MEDIUM

(71) Applicant: SPREADTRUM SEMICONDUCTOR (NANJING) CO., LTD., Jiangsu (CN)

(72) Inventor: Zhenzhu Lei, Jiangsu (CN)

(73) Assignee: SPREADTRUM SEMICONDUCTOR (NANJING) CO., LTD., Nanjing (CN)

( * ) Notice: Subject to any disclaimer, the term of this patent is extended or adjusted under 35 U.S.C. 154(b) by 359 days.

(21) Appl. No.: 17/846,488

(22) Filed: Jun. 22, 2022

(65) Prior Publication Data

US 2022/0330184 A1 Oct. 13, 2022

Related U.S. Application Data

(63) Continuation of application No. PCT/CN2020/111101, filed on Aug. 25, 2020.

(30) Foreign Application Priority Data

Dec. 23, 2019 (CN) .......................... 201911340157.8

(51) Int. Cl.
*H04W 56/00* (2009.01)
*H04W 72/0446* (2023.01)
*H04W 72/0453* (2023.01)
*H04W 72/1263* (2023.01)

(52) U.S. Cl.
CPC ..... *H04W 56/001* (2013.01); *H04W 56/0045* (2013.01); *H04W 72/0446* (2013.01); *H04W 72/0453* (2013.01); *H04W 72/1263* (2013.01)

(58) Field of Classification Search
CPC .......... H04W 56/001; H04W 56/0045; H04W 72/0446; H04W 72/0453; H04W 72/1263; H04B 7/1853; H04J 3/0638; H04J 3/0682
See application file for complete search history.

(56) References Cited

U.S. PATENT DOCUMENTS 11,909,505 B2 * 2/2024 Gu ........................... H04B 7/19
2019/0342845 A1 * 11/2019 Laselva ............... H04B 7/18504

FOREIGN PATENT DOCUMENTS

EP 3188558 A1 * 7/2017 ............ H04W 24/02

OTHER PUBLICATIONS

Lenovo, Motorola Mobility, UL transmission in preconfigured resources for MTC, 3GPP TSG RAN WG1 #99 R1-1912319, Nov. 8, 2019.

(Continued)

*Primary Examiner* — Cheikh T Ndiaye
(74) *Attorney, Agent, or Firm* — HAUPTMAN HAM, LLP

(57) ABSTRACT

A method for uplink (UL) synchronization, a communication apparatus, and a storage medium are disclosed in embodiments of the disclosure. The method for UL synchronization includes: determining, by a terminal device, one or more transmission gaps in a UL shared channel resource, where the UL shared channel resource is a resource occupied by a scheduled UL shared channel, and the one or more transmission gaps are each M continuous time units subsequent to every N time units in the UL shared channel resource, and performing UL synchronization by using the one or more transmission gaps during transmission of the UL shared channel.

20 Claims, 7 Drawing Sheets

DETERMINING, BY THE TERMINAL DEVICE, A TA CORRESPONDING TO AN END OF THE TRANSMISSION OF THE UL SHARED CHANNEL IN EVERY N TIME UNITS, ACCORDING TO A DELAY VARIATION RATE INDICATED BY A NETWORK DEVICE, DURING THE TRANSMISSION OF THE UL SHARED CHANNEL — S501

PERFORMING, BY THE TERMINAL DEVICE, THE UL SYNCHRONIZATION BY USING THE TA AND M ADJACENT TIME UNITS SUBSEQUENT TO EVERY N TIME UNITS — S502

(56) References Cited

OTHER PUBLICATIONS

Thales, 3rd Generation Partnership Project; Technical Specification Group Radio Access Network; Solutions for NR to support non-terrestrial networks (NTN) (Release 16), 3GPP TR38.821 V1.0.0, Dec. 2, 2019.

The first office action issued in corresponding JP application No. 2022-538760 dated May 31, 2023.

The second office action issued in corresponding JP application No. 2022-538760 dated Oct. 3, 2023.

* cited by examiner

METHOD FOR UPLINK SYNCHRONIZATION, COMMUNICATION APPARATUS, AND STORAGE MEDIUM

CROSS REFERENCE TO RELATED APPLICATION(S)

This application is a continuation of International Application No. PCT/CN2020/111101, filed Aug. 25, 2020, which claims priority to Chinese Patent Application No. 201911340157.8, filed Dec. 23, 2019, the disclosures of which are hereby incorporated by reference in their entireties.

TECHNICAL FIELD

This application relates to the technical field of communication, and in particular, to a method for uplink (UL) synchronization, a communication apparatus, and a storage medium.

BACKGROUND

In communication connection of a same cell, time when uplink (UL) data of different terminal devices arrives at a base station requires synchronization, i.e., UL synchronization, for ensuring orthogonality between UL data transmitted by the terminal devices, thereby helping to eliminate intra-cell interference. At present, the terminal device ensures UL synchronization by adjusting a timing advance (TA) of UL data transmission.

However, in a non-terrestrial network scenario, due to rapid movement of a satellite relative to the terminal device, a propagation delay between the terminal device and the satellite may change rapidly over time, so even after the TA adjustment, a problem of frequent UL out-of-sync may occur. Therefore, for frequent UL out-of-sync in the non-terrestrial network scenario, how to maintain UL synchronization has become a research hotspot.

SUMMARY

In a first aspect, a method for uplink (UL) synchronization is provided in embodiments of the disclosure. The method includes: determining, by a terminal device, one or more transmission gaps in a UL shared channel resource, where the UL shared channel resource is a resource occupied by a scheduled UL shared channel, and the one or more transmission gaps are each M continuous time units subsequent to every N time units in the UL shared channel resource, and performing UL synchronization by using the one or more transmission gaps during transmission of the UL shared channel.

In a second aspect, a communication apparatus is provided in embodiments of the disclosure. The communication apparatus includes a memory configured to store computer programs and a processor configured to invoke the computer programs stored in the memory to: determine one or more transmission gaps in a UL shared channel resource, where the UL shared channel resource is a resource occupied by a scheduled UL shared channel, and the one or more transmission gaps are each M continuous time units subsequent to every N time units in the UL shared channel resource, and perform UL synchronization by using the one or more transmission gaps during transmission of the UL shared channel.

In a third aspect, a non-volatile computer-readable storage medium is provided in embodiments of the disclosure. The computer-readable storage medium stores computer programs. The computer programs include program instructions that, when executed by a processor, cause the processor to determine one or more transmission gaps in a UL shared channel resource, where the UL shared channel resource is a resource occupied by a scheduled UL shared channel, and the one or more transmission gaps are each M continuous time units subsequent to every N time units in the UL shared channel resource, and perform UL synchronization by using the one or more transmission gaps during transmission of the UL shared channel.

DETAILED DESCRIPTION

Embodiments of the disclosure will be described below with reference to accompanying drawings in embodiments of the disclosure.

At present, in communication connection of a same cell, a terminal device ensures uplink (UL) synchronization by performing timing advance (TA) adjustment on UL data. When data is transmitted for a long time, the terminal device is still unable to ensure UL synchronization by performing TA adjustment on the UL data. For example, in a non-terrestrial network scenario, due to rapid movement of a satellite relative to the terminal device, a propagation delay between the terminal device and the satellite may change rapidly over time, so even after the TA adjustment, a problem of frequent UL out-of-sync may occur. A method for UL synchronization is proposed in embodiments of the disclosure. A terminal device determines one or more transmission gaps in a UL shared channel resource, where the UL shared channel resource is a resource occupied by a scheduled UL shared channel, and the one or more transmission gaps are each M continuous time units subsequent to every N time units in the UL shared channel resource. UL synchronization is performed by using the one or more transmission gaps during transmission of the UL shared channel. According to the method, UL synchronization is performed by using the one or more determined transmission gaps, so that UL synchronization can be maintained when data is transmitted for a long time.

Figure 1:
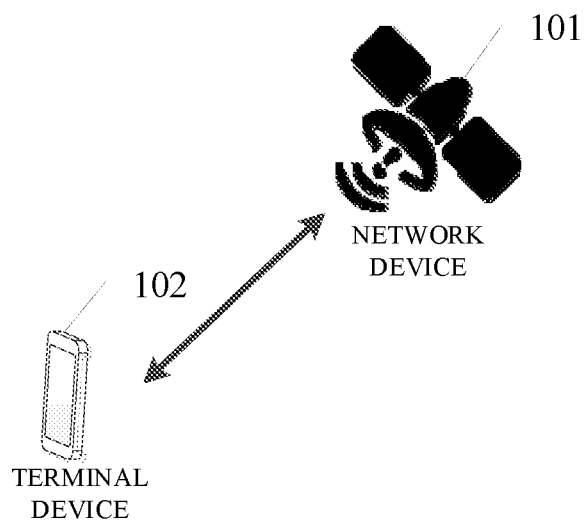
FIG. 1 is a schematic structural diagram of a communication system provided in embodiments of the disclosure.

Referring to FIG. 1, FIG. 1 is a schematic structural diagram of a communication system provided in embodiments of the disclosure. The communication system may include, but is not limited to, a network device and a terminal device. The number and form of devices illustrated in FIG. 1 are for example and do not constitute a limitation to embodiments of the disclosure. In practical application, two or more network devices and two or more terminal devices may be included. The communication system illustrated in FIG. 1 is described as including, for example, a network device 101 and a terminal device 102. The network device 101 in FIG. 1 provides a network service for the terminal device 102. For example, in FIG. 1, the network device 101 is a satellite, and the terminal device 102 is a mobile phone. During transmission of a UL shared channel, the terminal device 102 performs UL synchronization by using one or more determined transmission gaps.

In the disclosure, the terminal device may also be referred to as user equipment (UE), access terminal, subscriber unit, subscriber station, mobile site, mobile station, remote station, remote terminal, mobile device, user terminal, user agent, or user apparatus. In embodiments of the disclosure, the terminal device may be a mobile phone, a tablet, a computer with a wireless transceiver function, a virtual reality (VR) terminal device, an augmented reality (AR) terminal device, a wireless terminal in industrial control, a wireless terminal in self driving, a wireless terminal in remote medical, a wireless terminal in smart grid, a wireless terminal in transportation security, a wireless terminal in smart city, or a wireless terminal in smart home.

To facilitate the understanding of embodiments in the disclosure, some concepts involved in embodiments of the disclosure are first described. Illustration of these concepts includes but is not limited to the following.

A time-domain resource block in a communication system may be referred to as a time unit. For example, the time unit may be one or more radio frames, one or more subframes, one or more time slots, one or more mini slots, or one or more symbols.

A UL shared channel resource may be a time-frequency resource occupied by a UL shared channel scheduled via downlink control information (DCI). For example, a network device schedules ten time units for a physical uplink shared channel (PUSCH), that is, the UL shared channel resource is the ten time units.

The UL shared channel resource may be a preconfigured uplink resource (PUR). For example, to reduce radio resource control (RRC) signaling overhead and energy consumption of the terminal device caused by the terminal device transmitting UL data in an idle state, in an existing narrow band internet of things (NB-IoT) mechanism, the network device configures a dedicated periodic PUR for the terminal device, so the terminal device can directly transmit UL data on the PUR. The terminal device directly transmits UL data on the PUR, which avoids a process of initiating random access by the terminal device to enter a connected state.

Figure 2A:
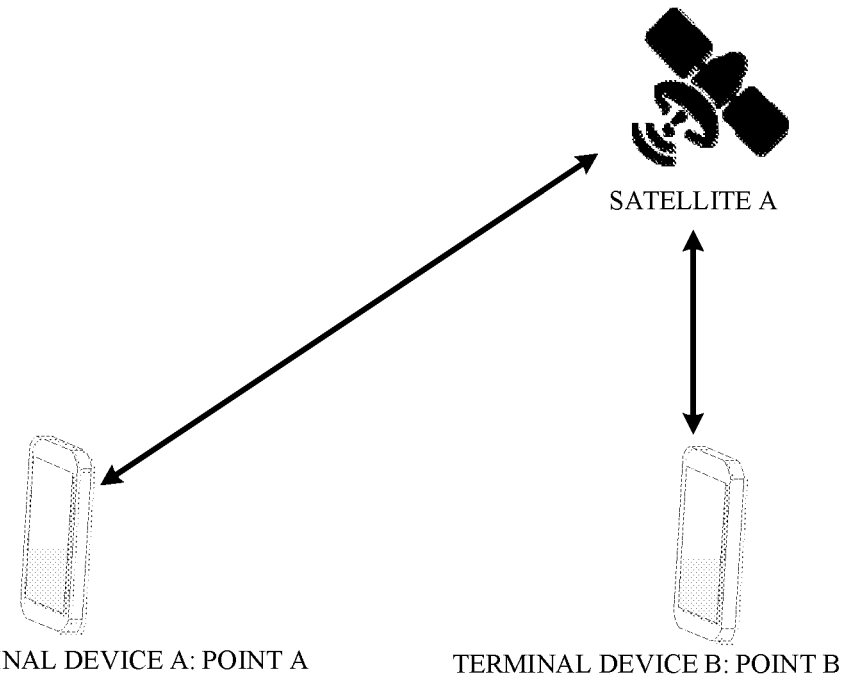
FIG. 2A is a schematic structural diagram of a fixed-point communication system provided in embodiments of the disclosure.

A maximum differential delay value is a difference between a propagation delay corresponding to a first position in a cell and a propagation delay corresponding to a second position in the cell. The first position is a position farthest from the network device in the cell, and the second position is a position closest to the network device in the cell. For example, a fixed-point communication system illustrated in FIG. 2A includes satellite A, terminal device A, and terminal device B, where terminal device A and terminal device B are located in a same cell. During communication between terminal device A, terminal device B, and satellite A, due to short communication time, a position change of the satellite is ignorable. Terminal device A is located at point A, and terminal device B is located at point B. Point A is the position farthest from the network device, and point B is the position closest to the network device. Then, the first position is point A, and the second position is point B. If a propagation delay corresponding to terminal device A at point A is ta, and a propagation delay corresponding to terminal device B at point B is tb, the maximum differential delay value is ta−tb.

Figure 2B:
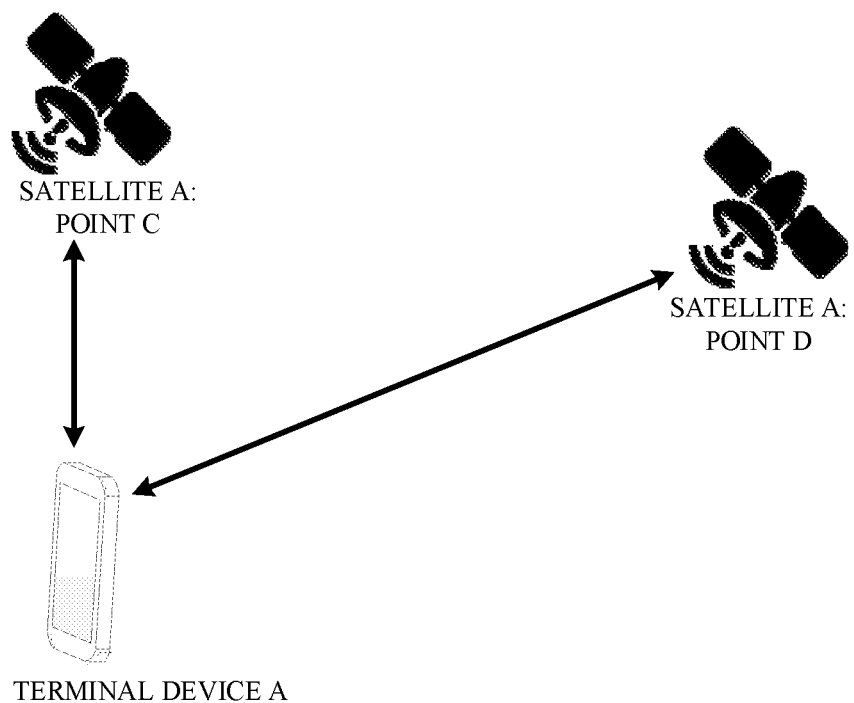
FIG. 2B is a schematic structural diagram of a mobile communication system provided in embodiments of the disclosure.

A maximum delay variation value is a difference between a propagation delay when the terminal device is farthest from the network device and a propagation delay when the terminal device is closest to the network device. For example, a mobile communication system illustrated in FIG. 2B includes satellite A and terminal device A. During communication between terminal device A and satellite A, satellite A is moving rapidly relative to terminal device A from point C to point D in FIG. 2B. When network device A is located at point C, a distance between terminal device A and network device A is shortest, and a propagation delay of terminal device A at this time is tc. When network device A is located at point D, terminal device A is farthest from network device A, and a propagation delay of terminal device A at this time is td. Then, the maximum delay variation value is tc−td.

Embodiments of the disclosure will be described below with reference to accompanying drawings in embodiments of the disclosure.

Figure 3:
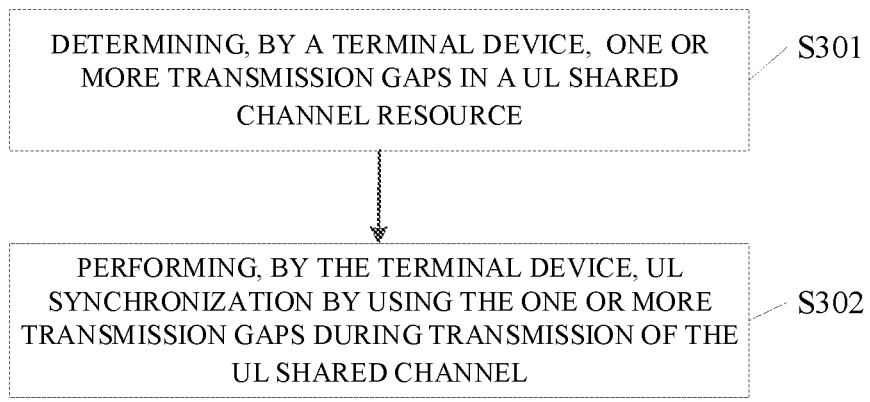
FIG. 3 is a schematic flowchart of a method for uplink (UL) synchronization provided in embodiments of the disclosure.

Based on the above description, a method for UL synchronization as illustrated in FIG. 3 is proposed in embodiments of the disclosure, and the method for UL synchronization may include operations at S301 to S302.

At S301, a terminal device determines one or more transmission gaps in a UL shared channel resource.

Figure 4:
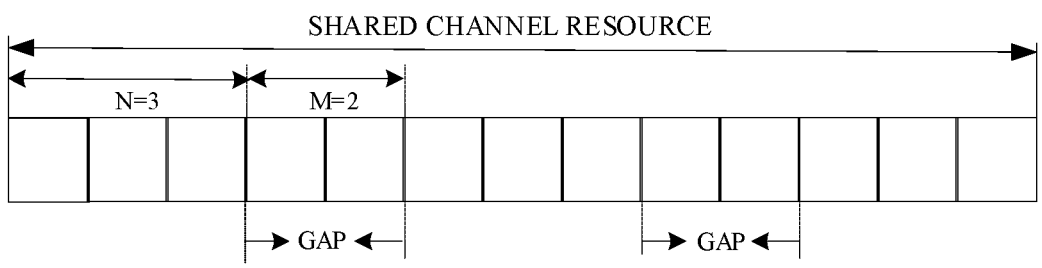
FIG. 4 is a schematic diagram of a determined transmission gap provided in embodiments of the disclosure.

In an embodiment, the terminal device determines one or more transmission gaps (gaps for short) in a UL shared channel before transmission of the UL shared channel. The one or more gaps are each M continuous time units subsequent to every N time units in the UL shared channel resource. For example, FIG. 4 illustrates two gaps determined by the terminal device, the value of N is 3, and the value of M is 2. It can be seen from FIG. 4 that each gap determined by the terminal device is two continuous time units subsequent to every three time units in the UL shared channel resource.

The M time units are UL time units. For example, the M time units are UL subframes. Only when the M time units are UL time units can the terminal device perform UL synchronization in the M time units. The value of the gap is configured via higher layer signaling. For example, the value of the gap is configured via RRC signaling or via a system message. The size of the gap is greater than or equal to the maximum differential delay value or the maximum delay variation value.

At S302, the terminal device performs UL synchronization by using the one or more transmission gaps during transmission of the UL shared channel.

Figure 5:
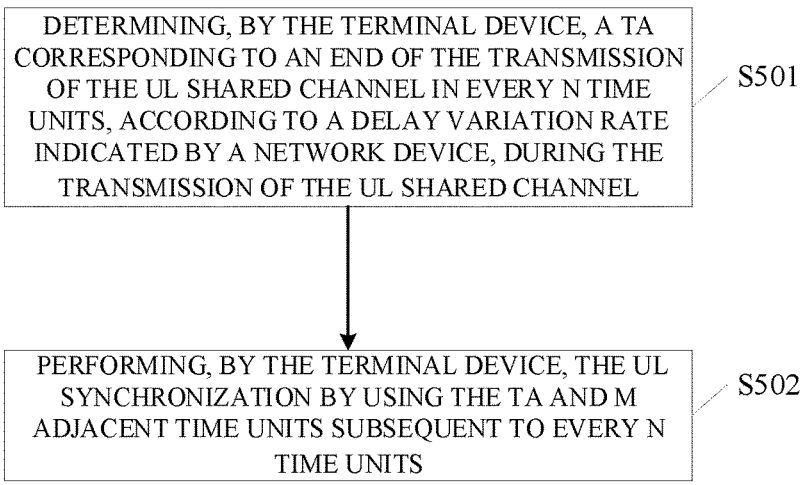
FIG. 5 is a schematic flowchart of a method for performing UL synchronization by using one or more transmission gaps provided in embodiments of the disclosure.

In an implementation, a method for performing UL synchronization by the terminal device by using the one or more transmission gaps during transmission of the UL shared channel is illustrated in a schematic flowchart illustrated in FIG. 5 and specifically includes the following.

At S501, the terminal device determines a TA corresponding to an end of the transmission of the UL shared channel in every N time units, according to a delay variation rate indicated by a network device, during the transmission of the UL shared channel.

The delay variation rate is transmitted by the network device to the terminal device. When transmitting the UL shared channel to the network device, the terminal device determines the TA corresponding to the end of the transmission of the UL shared channel in every N time units according to the delay variation rate indicated by the network device. Specifically, TAb corresponding to an end of transmission of every N time units is equal to a sum of TAa corresponding to an end of transmission of last N time units and a TA variation value $\Delta T$, the TA variation value $\Delta T=v*N*t$, that is, $TAb=TAa+\Delta T$, v is the delay variation rate indicated by the network device, and t is elapsed time for transmitting a time unit, where t is in seconds (s).

Figure 6:
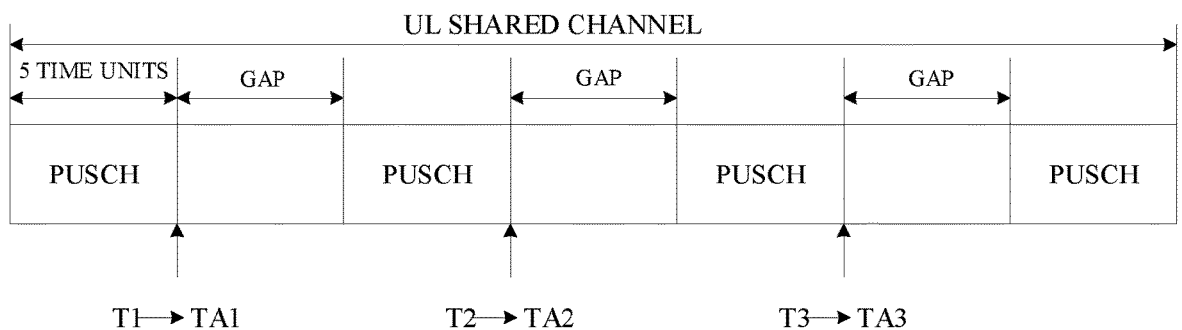
FIG. 6 is a schematic flowchart of a method for performing UL synchronization by using multiple transmission gaps provided in embodiments of the disclosure.

For example, as illustrated in FIG. 6, the UL shared channel resource includes multiple PUSCHs. The value of the delay variation rate v received by the terminal device from the network device before the transmission of the UL shared channel is 0.04 us/s. The value of N is 5. The value t of a time unit is 0.2 s. An initial TA, i.e., TA0, received from the network device is one time unit. Then, the terminal device determines that: TA1 at moment t1 is $TA1=TA0+\Delta T$, that is, TA1 is 1.04 time units, TA2 at moment t2 is $TA2=TA1+\Delta T$, that is, TA2 is 1.08 time units, and TA3 at moment t3 is $TA3=TA2+\Delta T$, that is, TA3 is 1.12 time units.

At S502, the terminal device performs the UL synchronization by using the TA and M continuous time units subsequent to every N time units.

Figure 7:
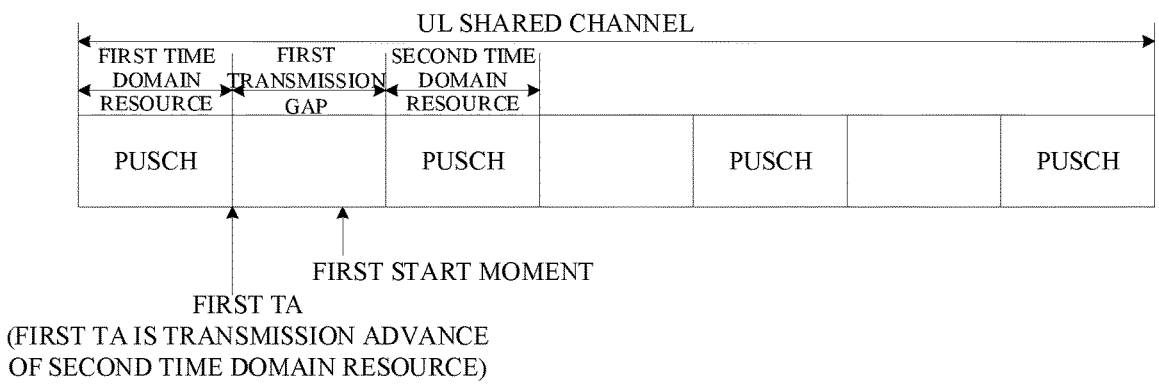
FIG. 7 is a schematic structural diagram of a UL shared channel resource provided in embodiments of the disclosure.

Specifically, as illustrated in FIG. 7, the UL shared channel resource includes a first time domain resource, a second time domain resource, and a first transmission gap. The first time domain resource and the second time domain resource are PUSCHs. The first transmission gap includes M time units. The first time domain resource is N continuous time units prior to the first transmission gap in time domain, and the second time domain resource is N continuous time units subsequent to the first transmission gap in time domain. The terminal device transmits the UL shared channel corresponding to the second time domain resource with a first start moment in the first transmission gap as a start, when the transmission of the UL shared channel on the first time domain resource ends. The first start moment is obtained by advancing a start moment of the second time domain resource by a first TA. The first TA is a TA corresponding to an end of the transmission of the UL shared channel on the first time domain resource. For example, the first gap determined by the terminal device is eight time units, and the first TA corresponding to an end of transmission on the first time domain resource is 2, then the terminal device determines that the first start moment is the sixth time unit subsequent to the first time domain resource, and starts to transmit the UL shared channel on the second time domain resource at a position which is the sixth time unit subsequent to the first time domain resource on the UL shared channel.

In embodiments of the disclosure, the terminal device first determines one or more gaps in the UL shared channel resource, and then performs UL synchronization by using the one or more gaps. With the one or more gaps determined by the terminal device, for every N time units, the terminal device can transmit the UL shared channel on a gap prior to the N time units with an advance of a corresponding TA, thereby ensuring UL synchronization during the transmission of the UL shared channel.

Figure 8:
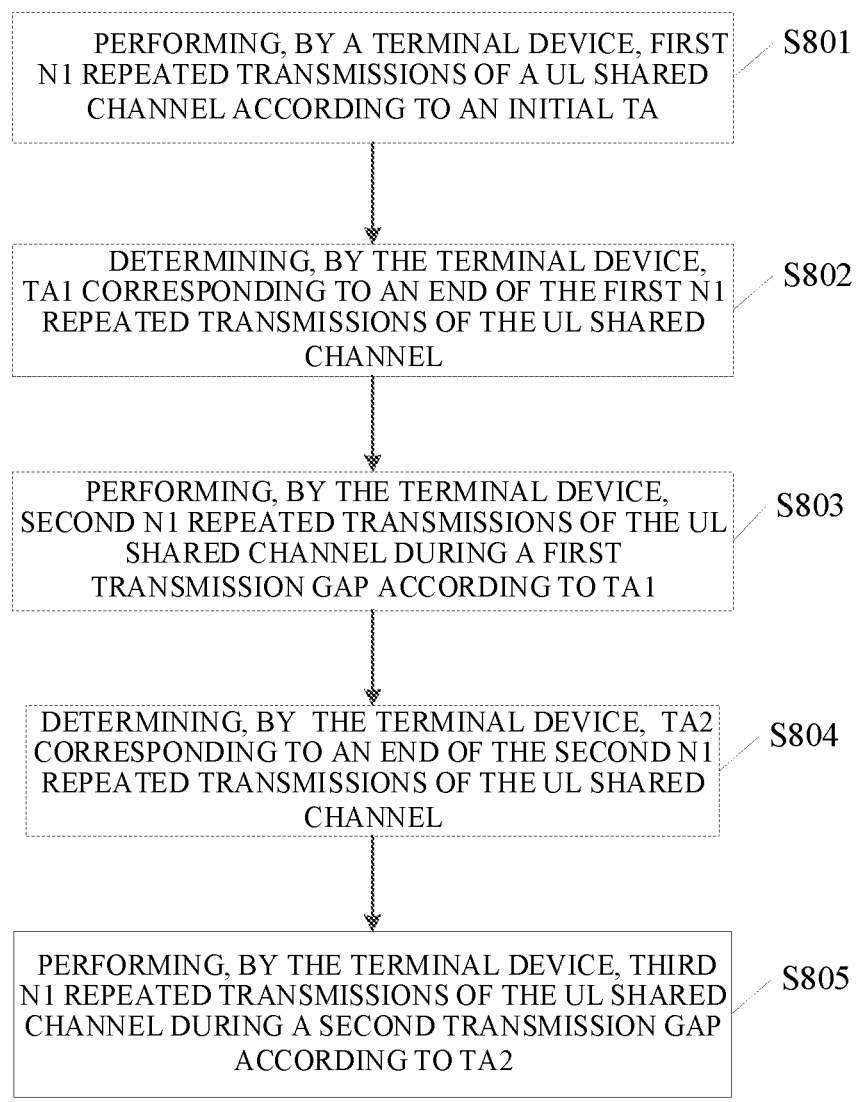
FIG. 8 is a schematic flowchart of another method for UL synchronization provided in embodiments of the disclosure.

Referring to FIG. 8, FIG. 8 is a schematic flowchart of another method for UL synchronization provided in embodiments of the disclosure. The method includes the following.

At S801, a terminal device performs first N1 repeated transmissions of a UL shared channel according to an initial TA.

In an implementation, every N time units in a UL shared channel resource is a time domain resource occupied by every N1 repeated transmissions of the UL shared channel. The time domain resource occupied by the N1 repeated transmissions of the UL shared channel may also be referred to as a time domain resource occupied by N1 UL shared channel-repeated transmissions. A value of N1 is semi-statically configured or dynamically indicated. A dynamic indication includes a DCI dynamic indication. For example, the network device preconfigures the value of N1 as 2, 4, 8, etc., and then dynamically indicates the value of N1 for a specific application via a DCI.

In an implementation, the initial TA is transmitted by the network device to the terminal device.

At S802, the terminal device determines TA1 corresponding to an end of the first N1 repeated transmissions of the UL shared channel.

Figure 9A:
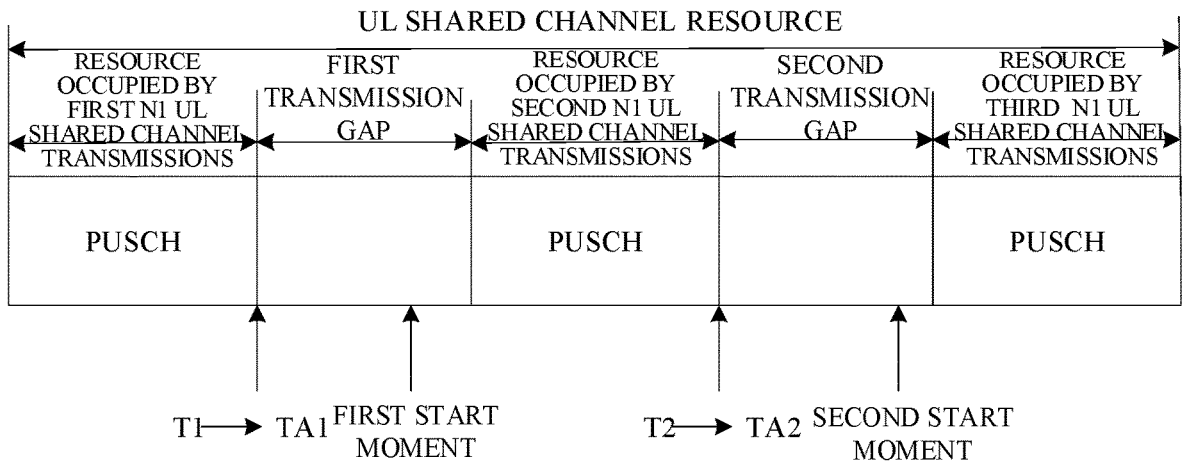
FIG. 9A is a schematic structural diagram of every N time units in a UL shared channel resource provided in embodiments of the disclosure.

As illustrated in FIG. 9A, TA1 is a TA corresponding to moment t1 in FIG. 9A, $TA1=TA0+v*N1*t$, TA0 is the initial TA, v is a delay variation rate, and t is elapsed time for one repeated transmission of the UL shared channel, where t is in seconds (s).

At S803, the terminal device performs second N1 repeated transmissions of the UL shared channel during a first transmission gap according to TA1.

The first transmission gap is a transmission gap subsequent to a time domain resource occupied by the first N1 repeated transmissions of the UL shared channel, and second N1 UL shared channel transmissions is N1 UL shared channel transmissions subsequent to the first transmission gap. Specifically, as illustrated in FIG. 9A, the terminal device transmits the UL shared channel corresponding to a resource for the second N1 UL shared channel transmissions to the network device at a first start moment, and performs the second N1 repeated transmissions of the UL shared channel. The first start moment is a moment preceding a start moment of the resource for the second N1 UL shared channel transmissions by TA1 time units.

At S804, the terminal device determines TA2 corresponding to an end of the second N1 repeated transmissions of the UL shared channel.

As illustrated in FIG. 9A, TA2 is a TA corresponding to moment t2 in FIG. 9A, TA2=TA1+v*N1*t.

At S805, the terminal device performs third N1 repeated transmissions of the UL shared channel during a second transmission gap according to TA2.

The second transmission gap is a transmission gap subsequent to a time domain resource occupied by the second N1 repeated transmissions of the UL shared channel, and third N1 UL shared channel transmissions is N1 UL shared channel transmissions subsequent to the second transmission gap. Specifically, as illustrated in FIG. 9A, the terminal device transmits the UL shared channel corresponding to a resource for the third N1 UL shared channel transmissions to the network device at a second start moment, and performs the third N1 repeated transmissions of the UL shared channel. The second start moment is a moment preceding a start moment of the resource for the third N1 UL shared channel transmissions by TA2 time units.

The UL shared channel resource illustrated in FIG. 9A includes three resources each occupied by N1 repeated transmissions of the UL shared channel. Optionally, the UL shared channel resource further includes four or five resources each occupied by N1 repeated transmissions of the UL shared channel, which is not limited herein. The number of resources occupied by N1 repeated transmissions of the UL shared channel included in the UL shared channel resource is related to the size of the UL shared channel resource and the value of N1.

In embodiments of the disclosure, the terminal device determines a moment to transmit every N1 repeated transmissions of the UL shared channel according to multiple transmission gaps and a TA corresponding to an end of every N1 repeated transmissions of the UL shared channel. The moment to transmit every N1 repeated transmissions of the UL shared channel is obtained according to each corresponding TA. UL synchronization can be realized by transmitting every N1 repeated transmissions of the UL shared channel in advance.

In an implementation, every N time units in the UL shared channel resource is a time domain resource occupied by every X*R repeated transmissions of the UL shared channel. The time domain resource occupied by the X*R repeated transmissions of the UL shared channel may also be referred to as a time domain resource occupied by X*R UL shared channel-repeated transmissions. A value of X is semi-statically configured or dynamically indicated. R is a total number of repeated transmissions of the UL shared channel. A dynamic indication includes a DCI dynamic indication. For example, the network device preconfigures a candidate value of X as 1, ½, ¼, ⅛, etc., and then dynamically indicates the value of X via a DCI. The total number R of repeated transmissions of the UL shared channel is 64, then the value of X*R may be respectively 64, 32, 16, 8, etc.

When every N time units in the UL shared channel resource is a time domain resource occupied by every X*R repeated transmissions of the UL shared channel, the following operations may also be performed.

At S1001, a terminal device performs first X*R repeated transmissions of a UL shared channel according to an initial TA.

At S1002, the terminal device determines TA1 corresponding to an end of the first X*R repeated transmissions of the UL shared channel.

Figure 9B:
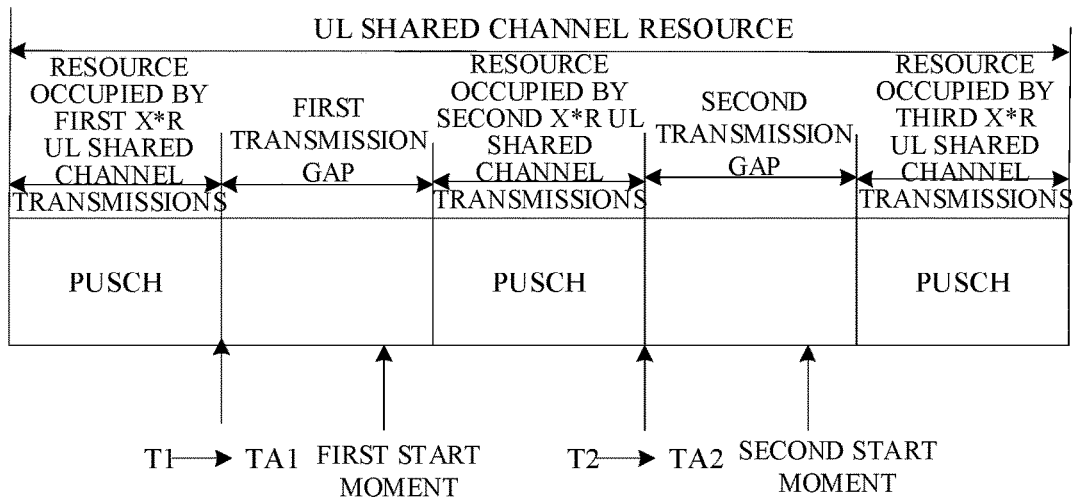
FIG. 9B is a schematic structural diagram of every N time units in another UL shared channel resource provided in embodiments of the disclosure.

As illustrated in FIG. 9B, TA1 is a TA corresponding to moment t1 in FIG. 9B, TA1=TA0+v*X*R*t, TA0 is the initial TA, v is a delay variation rate, and t is elapsed time for one transmission of the UL shared channel, where t is in seconds (s).

At S1003, the terminal device performs second X*R repeated transmissions of the UL shared channel during a first transmission gap according to TA1.

The first transmission gap is a transmission gap subsequent to a time domain resource occupied by the first X*R repeated transmissions of the UL shared channel, and second X*R UL shared channel transmissions is X*R UL shared channel transmissions subsequent to the first transmission gap. Specifically, as illustrated in FIG. 9B, the terminal device transmits the UL shared channel corresponding to a resource for the second X*R UL shared channel transmissions to the network device at a first start moment, and performs the second X*R repeated transmissions of the UL shared channel. The first start moment is a moment preceding a start moment of the resource for the second X*R UL shared channel transmissions by TA1 time units.

At S1004, the terminal device determines TA2 corresponding to an end of the second X*R repeated transmissions of the UL shared channel.

As illustrated in FIG. 9B, TA2 is a TA corresponding to moment t2 in FIG. 9B, TA2=TA1+v*X*R*t.

At S1005, the terminal device performs third X*R repeated transmissions of the UL shared channel during a second transmission gap according to TA2.

The second transmission gap is a transmission gap subsequent to a time domain resource occupied by the second X*R repeated transmissions of the UL shared channel, and third X*R UL shared channel transmissions is X*R UL shared channel transmissions subsequent to the second transmission gap. Specifically, as illustrated in FIG. 9B, the terminal device transmits the UL shared channel corresponding to a resource for the third X*R UL shared channel transmissions to the network device at a second start moment, and performs the third X*R repeated transmissions of the UL shared channel. The second start moment is a moment preceding a start moment of the resource for the third X*R UL shared channel transmissions by TA2 time units.

The UL shared channel resource illustrated in FIG. 9B includes three resources each occupied by X*R repeated transmissions of the UL shared channel. Optionally, the UL shared channel resource may further include four or five resources each occupied by X*R repeated transmissions of the UL shared channel, which is not limited herein. The number of resources occupied by X*R repeated transmissions of the UL shared channel included in the UL shared channel resource is related to the size of the UL shared channel resource, the value of X, and the value of R.

In embodiments of the disclosure, the terminal device determines a moment to transmit every X*R repeated transmissions of the UL shared channel according to multiple transmission gaps and a TA corresponding to an end of every X*R repeated transmissions of the UL shared channel, so that every X*R repeated transmissions of the UL shared channel is transmitted in advance, thereby realizing UL synchronization.

Figure 9C:
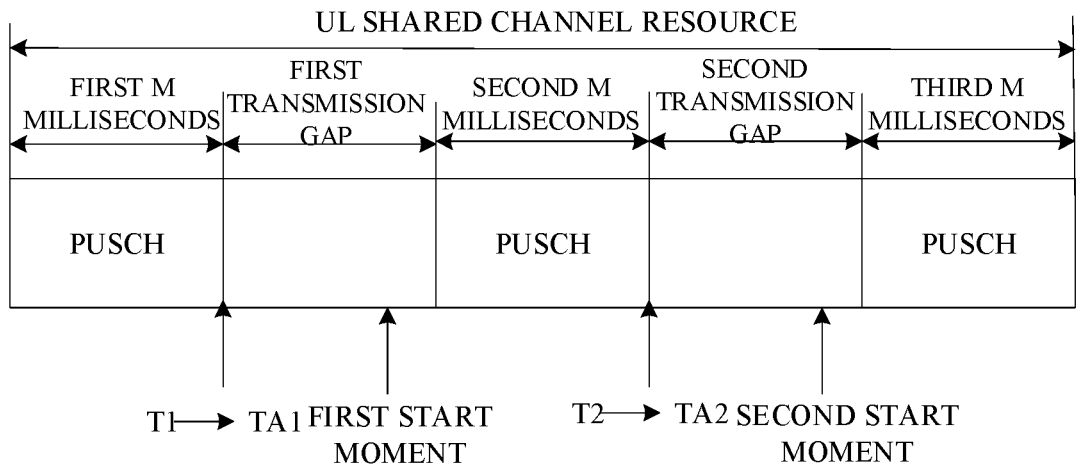
FIG. 9C is a schematic structural diagram of every N time units in another UL shared channel resource provided in embodiments of the disclosure.

In an implementation, when one time unit in the UL shared channel resource is one millisecond, as illustrated in FIG. 9C, every N time units is M milliseconds. The value of M is semi-statically configured or dynamically indicated. A dynamic indication includes a DCI dynamic indication. For example, the network device preconfigures a candidate value of M as 1, 2, 4, 8, etc., and then dynamically indicates the value of M via a DCI. If the DCI dynamically indicates that the value of M is 8, then every N time units is eight milliseconds.

When every N time units is M milliseconds, the following operations may also be performed.

At S1101, a terminal device performs a first M millisecond-repeated transmission of a UL shared channel according to an initial TA.

At S1102, the terminal device determines TA1 corresponding to an end of the first M millisecond-repeated transmission.

As illustrated in FIG. 9C, TA1 is a TA corresponding to moment t1 in FIG. 9C, TA1=TA0+v*M, TA0 is the initial TA, and v is a delay variation rate.

At S1103, the terminal device performs a second M millisecond-repeated transmission of the UL shared channel during a first transmission gap according to TA1.

The first transmission gap is a transmission gap subsequent to a time domain resource occupied by the first M millisecond-repeated transmission of the UL shared channel, and a second M millisecond-UL shared channel is a M millisecond-UL shared channel subsequent to the first transmission gap. Specifically, as illustrated in FIG. 9C, the terminal device transmits the UL shared channel corresponding to a second M millisecond-UL shared channel resource to the network device at a first start moment, and performs the second M millisecond-repeated transmission of the UL shared channel. The first start moment is a moment preceding a start moment of the second M milliseconds by TA1 time units.

At S1104, the terminal device determines TA2 corresponding to an end of the second M millisecond-repeated transmission of the UL shared channel.

As illustrated in FIG. 9C, TA2 is a TA corresponding to moment t2 in FIG. 9C, TA2=TA1+v*M.

At S1105, the terminal device performs a third M millisecond-repeated transmission of the UL shared channel during a second transmission gap according to TA2.

The second transmission gap is a transmission gap subsequent to a time domain resource occupied by the second M millisecond-repeated transmission of the UL shared channel, and a third M millisecond-UL shared channel is a UL shared channel corresponding to a M millisecond-UL shared channel resource subsequent to the second transmission gap. Specifically, as illustrated in FIG. 9C, the terminal device transmits the UL shared channel corresponding to a third M millisecond-UL shared channel resource to the network device at a second start moment, and performs the third M millisecond-repeated transmission of the UL shared channel. The second start moment is a moment preceding a start moment of the third M milliseconds by TA2 time units.

The UL shared channel resource illustrated in FIG. 9C includes three resources each occupied by a M millisecond-repeated transmission of the UL shared channel. Optionally, the UL shared channel resource may further include two, four, or five resources each occupied by a M millisecond-repeated transmission of the UL shared channel, which is not limited herein. The number of resources occupied by M millisecond-repeated transmissions of the UL shared channel included in the UL shared channel resource is related to the size of the UL shared channel resource and the value of M.

In embodiments of the disclosure, the terminal device determines a moment to transmit every M millisecond-repeated transmission of the UL shared channel according to multiple transmission gaps and a TA corresponding to an end of every M millisecond-repeated transmission of the UL shared channel, so that every M millisecond-repeated transmission of the UL shared channel can be transmitted in advance, thereby realizing UL synchronization.

In an implementation, resources scheduled by the UL shared channel resource are multiple transport blocks (TB). Every N time units is a time domain resource occupied by transmission of each TB among the multiple scheduled TBs.

When every N time units is the time domain resource occupied by transmission of each TB among the multiple scheduled TBs, the following operations may also be performed.

At S1201, a terminal device transmits a first TB according to an initial TA.

At S1202, the terminal device determines TA1 corresponding to an end of transmission of the first TB.

Figure 9D:
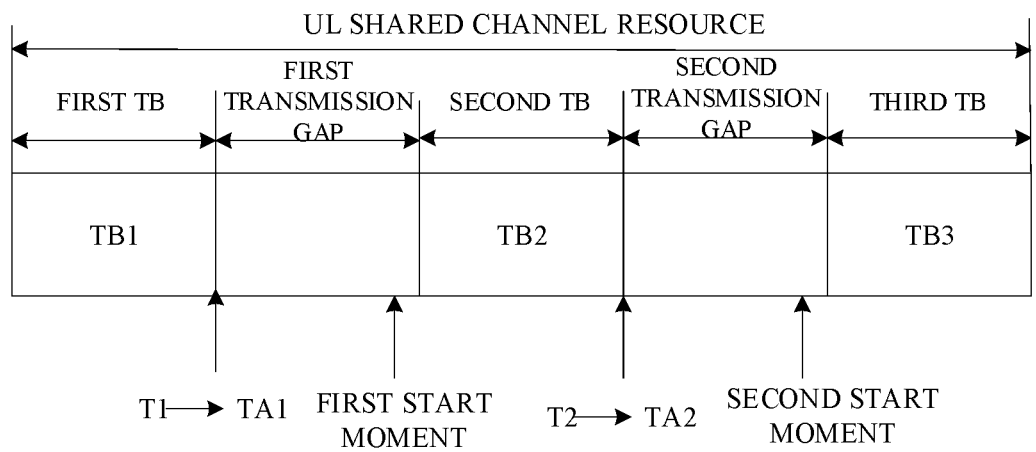
FIG. 9D is a schematic structural diagram of every N time units in another UL shared channel resource provided in embodiments of the disclosure.

As illustrated in FIG. 9D, TA1 is a TA corresponding to moment t1 in FIG. 9D, TA1=TA0+v*t, TA0 is the initial TA, v is a delay variation rate, and t is elapsed time for transmission of one TB, where t is in second (s).

At S1203, the terminal device transmits a second TB during a first transmission gap according to TA1.

The first transmission gap is a transmission gap subsequent to a time domain resource occupied by the transmission of the first TB, and the second TB is a TB subsequent to the first transmission gap. Specifically, as illustrated in FIG. 9D, the terminal device transmits the second TB to the network device at a first start moment. The first start moment is a moment preceding a start moment of the second TB by TA1 time units.

At S1204, the terminal device determines TA2 corresponding to an end of transmission of the second TB.

As illustrated in FIG. 9D, TA2 is a TA corresponding to moment t2 in FIG. 9D, TA2=TA1+v*t.

At S1205, the terminal device transmits a third TB during a second transmission gap according to TA2.

The second transmission gap is a transmission gap subsequent to a time domain resource occupied by the transmission of the second TB, and the third TB is a TB subsequent to the second transmission gap. Specifically, as illustrated in FIG. 9D, the terminal device transmits the third TB to the network device at a second start moment. The second start moment is a moment preceding a start moment of the third TB by TA2 time units.

The number of TBs included in the UL shared channel resource illustrated in FIG. 9D is three. Optionally, the number of TBs included in the UL shared channel resource may be four, five, or six, etc., which is not limited herein. The number of TBs included in the UL shared channel resource is related to the size of the UL shared channel resource and the time unit occupied by each TB.

In embodiments of the disclosure, the terminal device determines a moment to transmit each TB according to multiple transmission gaps and a TA corresponding to an end of transmission of each TB. UL synchronization can be realized by transmitting each TB in advance.

In an implementation, resources scheduled by the UL shared channel resource are multiple TBs. Every N time units is a time domain resource occupied by transmission of every N2 TBs among the multiple scheduled TBs. A value of N2 is semi-statically configured or dynamically indicated. For example, the network device preconfigures a candidate value of N2 as 2, 4, 8, 16, etc., and then dynamically indicates the value of N2 via a DCI. N2 is greater than or equal to 2.

When every N time units is the time domain resource occupied by transmission of every N2 TBs among the multiple scheduled TBs, the following operations may also be performed.

At S1301, a terminal device performs a first repeated transmission of N2 TBs according to an initial TA.

At S1302, the terminal device determines TA1 corresponding to an end of the first repeated transmission of N2 TBs.

Figure 9E:
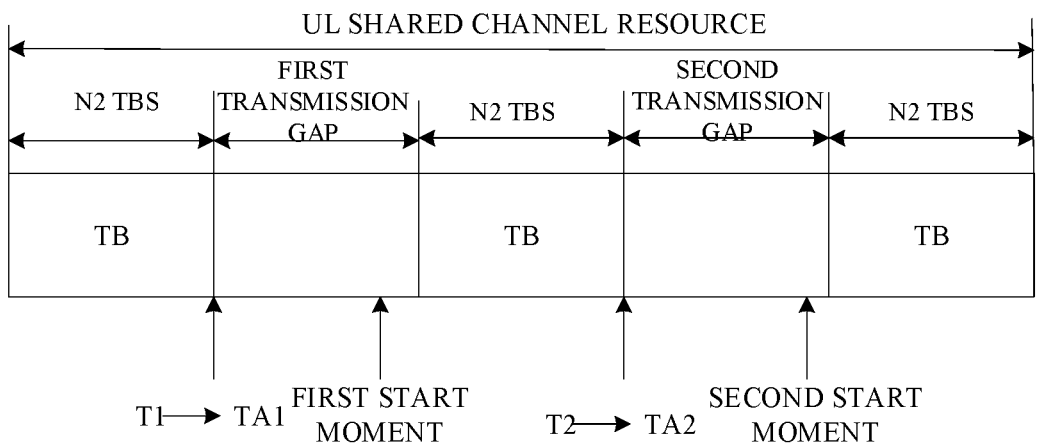
FIG. 9E is a schematic structural diagram of every N time units in another UL shared channel resource provided in embodiments of the disclosure.

As illustrated in FIG. 9E, TA1 is a TA corresponding to moment t1 in FIG. 9E, TA1=TA0+v*N2*t, TA0 is the initial TA, v is a delay variation rate, and t is elapsed time for transmitting a TB, where t is in seconds (s).

At S1303, the terminal device performs a second repeated transmission of N2 TBs during a first transmission gap according to TA1.

The first transmission gap is a transmission gap subsequent to a time domain resource occupied by the first repeated transmission of N2 TBs, and second N2 TBs are N2 TBs subsequent to the first transmission gap. Specifically, as illustrated in FIG. 9E, the terminal device transmits the second N2 TBs to the network device at a first start moment, and performs the second repeated transmission of N2 TBs. The first start moment is a moment preceding a start moment of the second N2 TBs by TA1 time units.

At S1304, the terminal device determines TA2 corresponding to an end of the second repeated transmission of N2 TBs.

As illustrated in FIG. 9D, TA2 is a TA corresponding to moment t2 in FIG. 9D, TA2=TA1+v*N2*t.

At S1305, the terminal device performs a third repeated transmission of N2 TBs during a second transmission gap according to TA2.

The second transmission gap is a transmission gap subsequent to a time domain resource occupied by the second repeated transmission of N2 TBs, and third N2 TBs are N2 TBs subsequent to the second transmission gap. Specifically, as illustrated in FIG. 9E, the terminal device transmits the third N2 TBs to the network device at a second start moment, and performs the third repeated transmission of N2 TBs. The second start moment is a moment preceding a start moment of the third N2 TBs by TA2 time units.

The number of N2 TBs included in the UL shared channel resource illustrated in FIG. 9E is three. Optionally, the number of N2 TBs included in the UL shared channel resource may also be four, five, or six, which is not limited herein. The number of N2 TBs included in the UL shared channel resource is related to the size of the UL shared channel resource and the value of N2.

In embodiments of the disclosure, the terminal device determines a moment to transmit a repeated transmission of every N2 TBs according to multiple transmission gaps and a TA corresponding to an end of a repeated transmission of every N2 TBs. The moment to transmit a repeated transmission of every N2 TBs is obtained according to each TA, so that a repeated transmission of every N2 TBs can be transmitted in advance, thereby realizing UL synchronization.

Figure 10:
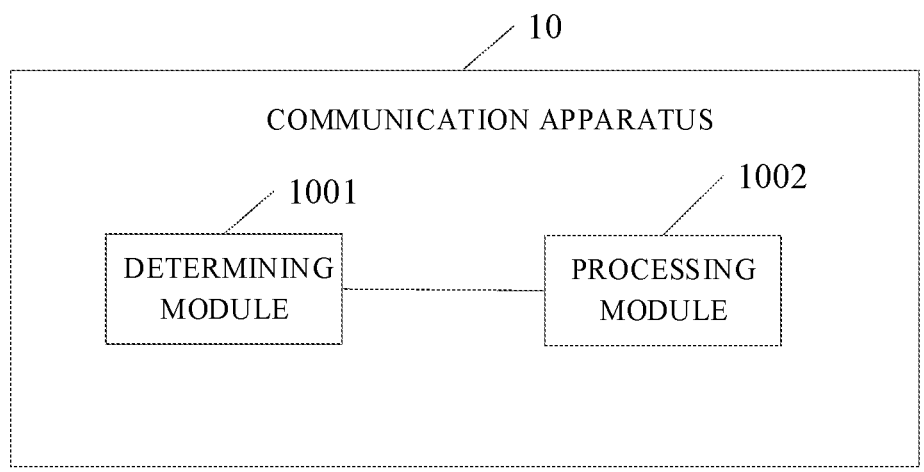
FIG. 10 is a schematic structural diagram of a communication apparatus provided in embodiments of the disclosure.

Referring to FIG. 10, FIG. 10 is a schematic structural diagram of a communication apparatus provided in embodiments of the disclosure. The communication apparatus is used in a terminal device, and the communication apparatus 10 may include a determining module 1001 and a processing module 1002.

The determining module 1001 is configured to determine one or more transmission gaps in a UL shared channel resource, where the UL shared channel resource is a resource occupied by a scheduled UL shared channel, and the one or more transmission gaps are each M continuous time units subsequent to every N time units in the UL shared channel resource. The processing module 1002 is configured to perform UL synchronization by using the one or more transmission gaps during transmission of the UL shared channel.

In an implementation, the UL shared channel resource is a time-frequency resource occupied by a UL shared channel scheduled via a DCI or a PUR.

In an implementation, every N time units in the UL shared channel resource is a time domain resource occupied by every N1 repeated transmissions of the UL shared channel, and a value of N1 is semi-statically configured or dynamically indicated.

In an implementation, every N time units in the UL shared channel resource is a time domain resource occupied by every X*R repeated transmissions of the UL shared channel, a value of X is semi-statically configured or dynamically indicated, and R is a total number of repeated transmissions of the UL shared channel.

In an implementation, every N time units in the UL shared channel resource is a time domain resource occupied by transmission of each TB among multiple scheduled TBs.

In an implementation, every N time units in the UL shared channel resource is a time domain resource occupied by transmission of every N2 TBs among multiple scheduled TBs, a value of N2 is semi-statically configured or dynamically indicated, and N2 is greater than or equal to 2.

In an implementation, the determining module 1001 is further configured to determine a TA corresponding to an end of the transmission of the UL shared channel in every N time units, according to a delay variation rate indicated by a network device, during the transmission of the UL shared channel. The processing module 1002 is further configured to perform the UL synchronization by using the TA and M continuous time units subsequent to every N time units.

In an implementation, the UL shared channel resource include a first time domain resource, a second time domain resource, and a first transmission gap, and the first transmission gap includes M time units. The first time domain resource is N continuous time units prior to the first transmission gap in time domain, and the second time domain resource is N continuous time units subsequent to the first transmission gap in time domain. The processing module 1002 is further configured to transmit the UL shared channel corresponding to the second time domain resource with a first start moment in the first transmission gap as a start, when the transmission of the UL shared channel on the first time domain resource ends. The first start moment is obtained by advancing a start moment of the second time domain resource by a first TA, and the first TA is a TA corresponding to an end of the transmission of the UL shared channel on the first time domain resource.

In an implementation, a size of the transmission gap is greater than or equal to a maximum differential delay value or a maximum delay variation value. The maximum differential delay value is a difference between a propagation delay corresponding to a first position in a cell and a propagation delay corresponding to a second position in the cell, the first position is a position farthest from the network device in the cell, and the second position is a position closest to the network device in the cell. The maximum delay variation value is a difference between a propagation delay when the terminal device is farthest from the network device and a propagation delay when the terminal device is closest to the network device.

In an implementation, the M time units are UL time units.

Figure 11:
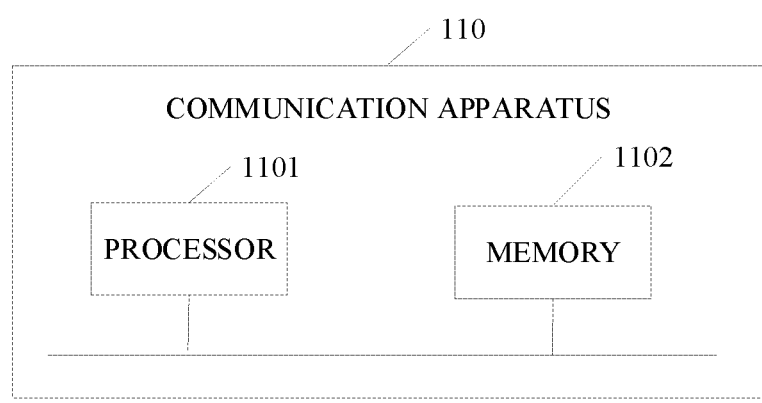
FIG. 11 is a schematic structural diagram of another communication apparatus provided in embodiments of the disclosure.

Referring to FIG. 11, FIG. 11 is a schematic structural diagram of a communication apparatus provided in embodiments of the disclosure. The communication apparatus may be a terminal device, an apparatus in the terminal device, or an apparatus that can be used with the terminal device. The communication apparatus 110 described in embodiments of the disclosure includes a processor 1101 and a memory 1102, and the processor 1101 and the memory 1102 are coupled via one or more communication buses.

The processor 1101 may be a central processing unit (CPU), or other general-purpose processors, digital signal processors (DSP), application specific integrated circuits (ASIC), field-programmable gate arrays (FPGA), or other programmable logic devices, discrete gates, or transistor logic devices, discrete hardware components, etc. The general-purpose processor may be a microprocessor or any conventional processor, etc. The processor 1101 is configured to support the terminal device to perform corresponding functions of the terminal device in methods described in FIG. 3 or FIG. 8.

The memory 1102 may include a read-only memory (ROM) and a random-access memory (RAM), and provide computer programs and data to the processor 1101. A portion of the memory 1102 may also include a non-volatile RAM. When invoking the computer programs, the processor 1101 is configured to: determine one or more transmission gaps in a UL shared channel resource, where the UL shared channel resource is a resource occupied by a scheduled UL shared channel, and the one or more transmission gaps are each M continuous time units subsequent to every N time units in the UL shared channel resource, and perform UL synchronization by using one or more transmission gaps during transmission of the UL shared channel.

In an implementation, the UL shared channel resource is a time-frequency resource occupied by a UL shared channel scheduled via a DCI or a PUR.

In an implementation, every N time units in the UL shared channel resource is a time domain resource occupied by every N1 repeated transmissions of the UL shared channel, and a value of N1 is semi-statically configured or dynamically indicated.

In an implementation, every N time units in the UL shared channel resource is a time domain resource occupied by every X*R repeated transmissions of the UL shared channel, a value of X is semi-statically configured or dynamically indicated, and R is a total number of repeated transmissions of the UL shared channel.

In an implementation, every N time units in the UL shared channel resource is a time domain resource occupied by transmission of each TB among multiple scheduled TBs.

In an implementation, every N time units in the UL shared channel resource is a time domain resource occupied by transmission of every N2 TBs among multiple scheduled TBs, a value of N2 is semi-statically configured or dynamically indicated, and N2 is greater than or equal to 2.

In an implementation, the processor 1101 is further configured to determine a TA corresponding to an end of the transmission of the UL shared channel in every N time units, according to a delay variation rate indicated by a network device, during the transmission of the UL shared channel. The processor 1101 is further configured to perform the UL synchronization by using the TA and M continuous time units subsequent to every N time units.

In an implementation, the UL shared channel resource include a first time domain resource, a second time domain resource, and a first transmission gap, and the first transmission gap includes M time units. The first time domain resource is N continuous time units prior to the first transmission gap in time domain, and the second time domain resource is N continuous time units subsequent to the first transmission gap in time domain. The processor 1101 is further configured to transmit the UL shared channel corresponding to the second time domain resource with a first start moment in the first transmission gap as a start, when the transmission of the UL shared channel on the first time domain resource ends. The first start moment is obtained by advancing a start moment of the second time domain resource by a first TA, and the first TA is a TA corresponding to an end of the transmission of the UL shared channel on the first time domain resource.

In an implementation, a size of the transmission gap is greater than or equal to a maximum differential delay value or a maximum delay variation value. The maximum differential delay value is a difference between a propagation delay corresponding to a first position in a cell and a propagation delay corresponding to a second position in the cell, the first position is a position farthest from the network device in the cell, and the second position is a position closest to the network device in the cell. The maximum delay variation value is a difference between a propagation delay when the terminal device is farthest from the network device and a propagation delay when the terminal device is closest to the network device.

In an implementation, the M time units are UL time units.

A computer-readable storage medium is further provided in embodiments of the disclosure. The computer-readable storage medium stores computer programs, and when executed by a processor, the computer programs can be configured to implement the method for UL synchronization described in embodiments corresponding to FIG. 3 or FIG. 8 of embodiments of the disclosure, which is not repeated herein.

The computer-readable storage medium may be an internal storage unit of the terminal device described in any of foregoing embodiments, such as a hard disk or a memory of the device. The computer-readable storage medium may also be an external storage device of the terminal device, such as a plug-in hard disk, a smart media card (SMC), a secure digital (SD) card, or a flash card equipped on the device, etc. Further, the computer-readable storage medium may also include an internal storage unit of the terminal device and an external storage device. The computer-readable storage medium is configured to store computer programs and other programs and data required by the terminal device. The computer-readable storage medium can also be configured to temporarily store data that has been or will be output.

Those of ordinary skill in the art can understand that all or part of processes in methods of above embodiments can be implemented by instructing a relevant hardware through computer programs, and the programs can be stored in a readable storage medium. When executed, the programs may be configured to perform processes of embodiments of above-mentioned methods. The storage medium may be a magnetic disk, an optical disk, a ROM, a RAM, etc.

The above only discloses preferred embodiments of the disclosure, which of course do not constitute a limitation to the scope of this application. Therefore, equivalent changes made according to the claims of the disclosure still fall within the scope of this application.

What is claimed is:

1. A method for uplink (UL) synchronization, performed by a terminal device, the method comprising:

determining one or more transmission gaps in a UL shared channel resource, wherein the UL shared channel resource is a resource occupied by a scheduled UL shared channel, and the one or more transmission gaps are each M continuous time units subsequent to every N time units in the UL shared channel resource;

determining a timing advance (TA) according to a delay variation rate indicated by a network device, during transmission of the UL shared channel; and performing UL synchronization by using the TA and the one or more transmission gaps during the transmission of the UL shared channel.

2. The method of claim 1, wherein the UL shared channel resource is a time-frequency resource occupied by a UL shared channel scheduled via downlink control information (DCI) or a preconfigured UL resource (PUR).

3. The method of claim 1, wherein every N time units in the UL shared channel resource is a time domain resource occupied by every N1 repeated transmissions of the UL shared channel, and a value of N1 is semi-statically configured or dynamically indicated.

4. The method of claim 1, wherein every N time units in the UL shared channel resource is a time domain resource occupied by every X*R repeated transmissions of the UL shared channel, a value of X is semi-statically configured or dynamically indicated, and R is a total number of repeated transmissions of the UL shared channel.

5. The method of claim 1, wherein every N time units in the UL shared channel resource is a time domain resource occupied by transmission of each transport block (TB) among a plurality of scheduled TBs.

6. The method of claim 1, wherein every N time units in the UL shared channel resource is a time domain resource occupied by transmission of every N2 TBs among a plurality of scheduled TBs, a value of N2 is semi-statically configured or dynamically indicated, and N2 is greater than or equal to 2.

7. The method of claim 1, wherein the TA corresponds to an end of the transmission of the UL shared channel in every N time units.

8. The method of claim 7, wherein
the UL shared channel resource comprises a first time domain resource, a second time domain resource, and a first transmission gap, and the first transmission gap comprises M time units;
the first time domain resource is N continuous time units prior to the first transmission gap in time domain, and the second time domain resource is N continuous time units subsequent to the first transmission gap in time domain;
performing the UL synchronization by using the TA and the M continuous time units subsequent to every N time units comprises:
transmitting the UL shared channel corresponding to the second time domain resource with a first start moment in the first transmission gap as a start, when the transmission of the UL shared channel on the first time domain resource ends, wherein
the first start moment is obtained by advancing a start moment of the second time domain resource by a first TA, and the first TA is a TA corresponding to an end of the transmission of the UL shared channel on the first time domain resource.

9. The method of claim 1, wherein a size of the transmission gap is greater than or equal to a maximum differential delay value or a maximum delay variation value;

the maximum differential delay value is a difference between a propagation delay corresponding to a first position in a cell and a propagation delay corresponding to a second position in the cell, the first position is a position farthest from the network device in the cell, and the second position is a position closest to the network device in the cell; and the maximum delay variation value is a difference between a propagation delay when the terminal device is farthest from the network device and a propagation delay when the terminal device is closest to the network device.

10. The method of claim 1, wherein the M time units are UL time units.

11. A communication apparatus, comprising:
a memory configured to store computer programs; and
a processor configured to invoke the computer programs stored in the memory to:
determine one or more transmission gaps in a UL shared channel resource, wherein the UL shared channel resource is a resource occupied by a scheduled UL shared channel, and the one or more transmission gaps are each M continuous time units subsequent to every N time units in the UL shared channel resource;
determine a timing advance (TA) according to a delay variation rate indicated by a network device, during transmission of the UL shared channel; and
perform UL synchronization by using the TA and the one or more transmission gaps during the transmission of the UL shared channel.

12. The communication apparatus of claim 11, wherein the UL shared channel resource is a time-frequency resource occupied by a UL shared channel scheduled via downlink control information (DCI) or a preconfigured UL resource (PUR).

13. The communication apparatus of claim 11, wherein every N time units in the UL shared channel resource is a time domain resource occupied by every N1 repeated transmissions of the UL shared channel, and a value of N1 is semi-statically configured or dynamically indicated.

14. The communication apparatus of claim 11, wherein every N time units in the UL shared channel resource is a time domain resource occupied by every X*R repeated transmissions of the UL shared channel, a value of X is semi-statically configured or dynamically indicated, and R is a total number of repeated transmissions of the UL shared channel.

15. The communication apparatus of claim 11, wherein every N time units in the UL shared channel resource is a time domain resource occupied by transmission of each transport block (TB) among a plurality of scheduled TBs.

16. The communication apparatus of claim 11, wherein every N time units in the UL shared channel resource is a time domain resource occupied by transmission of every N2 TBs among a plurality of scheduled TBs, a value of N2 is semi-statically configured or dynamically indicated, and N2 is greater than or equal to 2.

17. The communication apparatus of claim 11, wherein the TA corresponds to an end of the transmission of the UL shared channel in every N time units.

18. The communication apparatus of claim 17, wherein
the UL shared channel resource comprises a first time domain resource, a second time domain resource, and a first transmission gap, and the first transmission gap comprises M time units;

the first time domain resource is N continuous time units prior to the first transmission gap in time domain, and the second time domain resource is N continuous time units subsequent to the first transmission gap in time domain;

the processor configured to perform the UL synchronization by using the TA and the M continuous time units subsequent to every N time units is configured to:

transmit the UL shared channel corresponding to the second time domain resource with a first start moment in the first transmission gap as a start, when the transmission of the UL shared channel on the first time domain resource ends, wherein the first start moment is obtained by advancing a start moment of the second time domain resource by a first TA, and the first TA is a TA corresponding to an end of the transmission of the UL shared channel on the first time domain resource.

19. The communication apparatus of claim 11, wherein a size of the transmission gap is greater than or equal to a maximum differential delay value or a maximum delay variation value;

the maximum differential delay value is a difference between a propagation delay corresponding to a first position in a cell and a propagation delay corresponding to a second position in the cell, the first position is a position farthest from the network device in the cell, and the second position is a position closest to the network device in the cell; and the maximum delay variation value is a difference between a propagation delay when the communication apparatus is farthest from the network device and a propagation delay when the communication apparatus is closest to the network device.

20. A non-volatile computer-readable storage medium storing computer programs, wherein the computer programs comprise program instructions that, when executed by a processor, cause the processor to:

determine one or more transmission gaps in a UL shared channel resource, wherein the UL shared channel resource is a resource occupied by a scheduled UL shared channel, and the one or more transmission gaps are each M continuous time units subsequent to every N time units in the UL shared channel resource;

determine a timing advance (TA) according to a delay variation rate indicated by a network device, during transmission of the UL shared channel; and perform UL synchronization by using the TA and the one or more transmission gaps during the transmission of the UL shared channel.

* * * * *